2,302,430

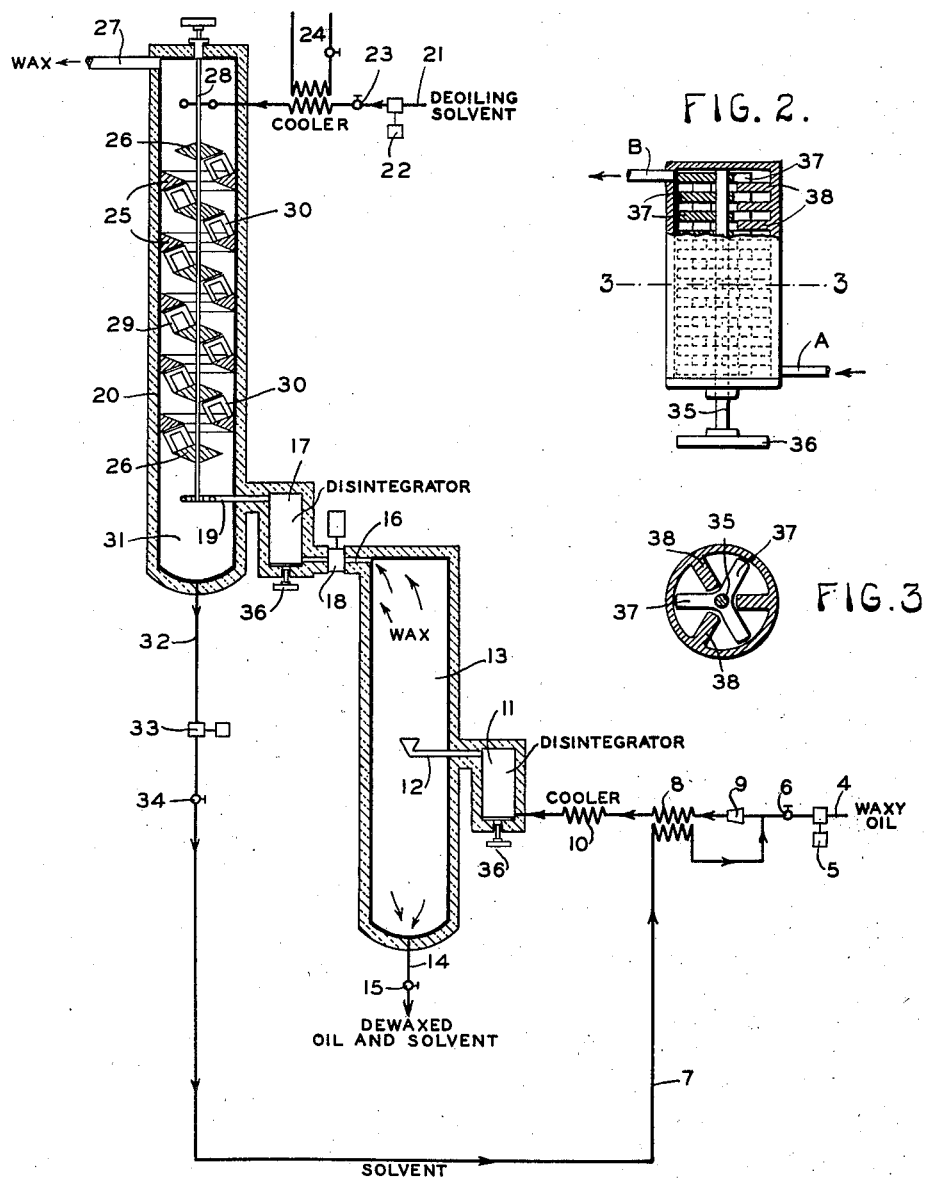
Nov. 17, 1942.  E. M. DONS ET AL  2,302,430
PROCESS OF SEPARATING OIL AND WAXES
Filed Jan. 2, 1942
INVENTORS:
E. M. DONS
O. G. MAURO
BY McCauley & McCauley
ATTORNEYS Patented Nov. 17, 1942

UNITED STATES PATENT OFFICE 2,302,430

PROCESS OF SEPARATING OIL AND WAXES

Eddie M. Dons and Oswald G. Mauro, Tulsa, Okla., assignors to Mid-Continent Petroleum Corporation, Tulsa, Okla., a corporation of Delaware Application January 2, 1942, Serial No. 425,386

7 Claims. (Cl. 196—18)

This invention relates to processes of separating oil and waxes. The invention may be employed in separating wax and oil found in various kinds of materials including mineral oils, petrolatum, slack wax and vegetable waxes. It can be conveniently used in dewaxing petroleum lubricating oils to produce low pour point lubricants, or in obtaining high melting point waxes from petrolatum, and in separating constituents of slack wax, as well as in the treatment of other products to separate waxy materials.

In this art, it is customary to resort to expensive filtering operations which do not remove all of the oil from the wax. A large mass of precipitated wax is usually deposited on the filter in the form of clusters of interlocked wax crystals with oil-retaining cavities inside of the clusters, and additional bodies of diluted oil are trapped between the clusters on the filter. A substantial percentage of the oil is thus retained in the mass of filtered wax.

An object of the present invention is to avoid the expense and trouble heretofore involved in the use of extremely large filters to separate the body of diluted oil from the wax, at the same time providing a less expensive system wherein the oil is more effectively removed from the wax particles. More specifically stated, an object is to provide a commercially feasible improvement including successive dewaxing and deoiling operations wherein the oil is positively released and separated from coalesced wax crystals.

The present invention involves a series of cooperative steps including a plurality of disintegrating operations to forcibly disintegrate the coalesced wax, thereby liberating trapped or occluded oil solution, and permitting free removal of oil from the disintegrated wax particles. A simple settling operation may be employed to separate free oil solution from the disintegrated wax particles, while a more active counterflow system is preferably employed to forcibly remove liberated oil solution from subsequently disintegrated wax particles.

With the foregoing and other objects in view, the invention comprises the novel process hereinafter more specifically described and shown in the accompanying drawing, which illustrates one form of the invention. However, it is to be understood that the invention comprehends changes, variations and modifications within the scope of the claims hereunto appended.

Briefly stated, a specific form of the invention comprises the cooperative effects of a series of steps, including the step of precipitating the wax in a cooled dewaxing solution, thereby trapping portions of the oil solution in coalesced wax crystals, disintegrating the coalesced wax to liberate the trapped oil solution, extracting the main body of relatively free oil solution from the disintegrated wax crystals, while again causing coalesced wax to trap portions of the oil solution, and thereafter subjecting the coalesced wax to forcible disintegrating and deoiling operations wherein previously trapped solution is forcibly removed from the wax.

In comparing this process with the usual filtering systems wherein a solvent is sprayed onto the wax deposited on the surface of the filter, it will be observed that the so called "wax cake" on the filter is in the form of a compact body of wax clusters with oil particles trapped, or occluded, throughout the mass of wax, and that the spray of solvent can not remove such oil. This is quite different from the very simple cleansing action which occurs when a stream of the disintegrated wax clusters and free oil solution is merely discharged into a settling zone where the wax readily separates from the relatively free oil solution, and then flows through another disintegrating zone associated with a deoiling zone where each minute wax particle is exposed to the forcible cleansing action of a counterflowing solvent stream. In this manner we can positively remove and economically recover a substantial percentage of valuable oil which ordinarily remains as an impurity in the wax.

It is to be understood that such unusual efficiency in removing and purifying the wax also increases the yield of dewaxed oil, and in many cases the main object is to remove and recover the optimum percentage of dewaxed oil, without resorting to expensive refining operations.

The wax may be precipitated in any desired manner and at any suitable temperature, a low temperature being required in dewaxing lubricating oils to produce low pour point lubricants, while much higher temperatures are usually desired for the precipitation of high melting point wax in petrolatum, or in the separation of high melting point wax from low melting point wax which may or may not contain a substantial percentage of oil. The gravity separation of the wax and dewaxed solution may be due to a relatively high density of the solution, or to a relatively high density of the wax particles. Advantages are gained in a true counterflow wherein a rising stream of wax particles contacts directly with a continuous descending stream of cleansing solvent, but this condition may be reversed, and various types of batch systems could be employed to obtain some of the advantages of the invention.

However, the preferred form of the invention includes the steps of precipitating wax in a solution, and disintegrating the resultant wax clusters to liberate trapped oil solution, followed by gravity separation of the disintegrated wax from free portions of the oil solution, while again trapping portions of the oil solution in coalesced wax, and then forcibly disintegrating a continuous stream of the coalesced wax to release the trapped oil solution before the wax reaches a countercurrent deoiling zone.

The countercurrent deoiling operation may be carried out to any desired extent, depending upon economic conditions or the nature of the products sought in the process. In some cases, more or less of the oil may be deliberately retained in the wax, thereby reducing the time factor in the countercurrent deoiling zone where the liberated oil solution is forcibly removed from the disintegrated wax particles.

To most effectively establish and maintain the new combination of conditions, the nature of the solvents requires consideration, not with the idea of producing filterable wax, but to provide for comparatively rapid movements of the wax and other conditions in the new process. The density or specific gravity of the solvent is an important consideration in the step of causing the rapid gravity separation of the disintegrated wax from the dewaxing solution, and also in the subsequent step of passing a stream of disintegrated wax particles through a counter-flowing stream of cleansing solution. The viscosity of the solution and solvent even at very low temperatures, is another factor that should not prevent the desired free and rapid movements of the wax particles. Another property of the solvent relates to the interfacial tension existing between the wax particles and the oil solution, or between said wax particles and the deoiling solvent. This interfacial tension is a subject separate and distinct from the viscosity, and it should not be high enough to interfere with said free and rapid movements of the wax particles, even when the operations are carried out at very low temperatures, such as 0° F., or lower. However, the invention is not limited to a particular solvent, as the various properties can be obtained from numerous different solvents.

Illustrations of suitable solvents include methylene dichloride combined with dichlorethyl ether or sulfur dioxide; methylene dichloride combined with acetone, or with isopropyl acetate and dichlorethyl ether. Sulfur dioxide mixed with dichlorodifluoromethane, or with perchlorethylene. Or a mixture of dichlorethyl ether and perchlorethylene. Or, methylene dichloride with ethyl bromide. Mixtures of three or more solvents may be employed. However, for convenience in commercial practice, methylene dichloride and dichlorethyl ether (chlorex) provide a desirable combination of only two solvents.

Fig. 1 is a diagrammatical view of a system which may be employed to carry out one form of the invention.

Fig. 2 is a detail view of one of the disintegrators shown in Fig. 1.

Fig. 3 is a section taken approximately on the line 3—3 in Fig. 2.

A continuous regulated stream of the wax-bearing charging stock, for example, a lubricating oil stock, enters the system through a pipe 4 which may be provided with a pump 5 and a regulating valve 6. A continuous stream of selective dewaxing solvent, from sources to be hereafter described, may be conducted through a pipe 7 and heat exchanger 8 to the oil supply pipe 4. The continuous stream of oil and dewaxing solvent are united in the pipe 4 and transmitted through a mixing nozzle 9 where the oil and solvent are mixed at a temperature high enough to form the desired dewaxing solution.

The continuous stream of solution is transmitted through the heat exchanger 8 for preliminary cooling. Thereafter, the stream of solution passes through a cooler, or chiller, 10 where the flowing solution is cooled to a temperature desired for precipitation of wax in the liquid solution. The wax crystals are thus coalesced to form relatively large clusters, with portions of the liquid oil solution trapped or occluded in the wax clusters.

A continuous stream of the resultant mixture is transmitted into a disintegrator 11 where the wax clusters are forcibly disintegrated to positively liberate the trapped oil solution. Thereafter, a continuous stream of the disintegrated wax and free oil solution is conducted through a pipe 12 to a settling chamber 13. This chamber 13 may be in the form of an upright column covered with insulation.

The incoming stream of chilled solution and disintegrated wax may be delivered from the pipe 12 to the settling chamber 13 at approximately the temperature selected for precipitation of wax in the cooler, or chiller, 10. For example, this temperature may be about 0° F., and we prefer to insulate the chamber 13 and disintegrator 11 to maintain the desired dewaxing temperatures therein.

We are assuming that a relatively dense or heavy solvent has been selected for the dewaxing operation, and that the viscosity and interfacial tension are low enough to allow the wax to freely rise in the dense solution. In this event, the major portion of the free oil solution will readily move downwardly to the bottom of the settling compartment 13 where it is discharged through a pipe 14, said pipe having a regulating valve 15 adjusted to regulate the flow therein. This continuous stream of outgoing solution is free of wax and it may be distilled in any suitable manner to remove the solvent from the dewaxed oil. It will be observed that most of the oil is very easily, quickly and economically dewaxed in the simple settling chamber 13, and immediately discharged from the dewaxing system.

Attention is now directed to the separating zone, or dewaxing zone established near the point where the incoming mixture of cooled solution and wax from pipe 12 enters the settling chamber 13. The disintegrated wax particles move upwardly and carry with them portions of the solution, including oily films around the wax particles and relatively free portions of the solution between the rising wax particles.

The rising masses of wax particles coalesce and trap or occlude portions of the liquid oil solution in the settling chamber 13. However, a continuous stream of the coalesced wax and oil solution is discharged through a pipe 16 at the upper portion of said chamber 13 to a separate disintegrator 17 wherein the coalesced wax is forcibly disintegrated to positively liberate the trapped oil solution from the wax clusters. The disintegrator 17 is covered with insulation, and a pump 18 may be employed to positively force a continuous stream of waxy material into said disintegrator.

The resultant continuous stream of disintegrated wax particles and liberated oil solution is discharged through a pipe 19 which forms the inlet of a countercurrent deoiling system, including an insulated chamber 20. This countercurrent system may be designed to transmit a continuous stream of relatively heavy selective oil solvent through a rising stream of lighter wax particles. For example, a regulated stream of selective oil solvent may be transmitted through a pipe 21 provided with a pump 22, regulating valve 23, and cooler 24 through which the solvent stream is conducted into an upper portion of the chamber. The temperature of this regulated stream may be about the same as, or preferably somewhat higher than, the temperature in the dewaxing zone 13.

When a heavy deoiling solvent is employed, the stream of deoiling solvent from the cooler 24 will descend in direct contact with the rising stream of disintegrated wax particles, so as to selectively dissolve the free portions of oil solution carried by the wax, and also forcibly scrub the oily films from surfaces of the rising wax particles. This action may be aided by any suitable mechanical appliances. For example, the upper portion of the chamber 20 may be provided with alternating baffles including a series of rings 25 extending inwardly from the inner face of the chamber 20 and a series of central baffle members 26 arranged as shown in the drawing to produce an elongated tortuous passageway wherein the rising wax particles move back and forth in a zigzag course. The stream of selective deoiling solvent descends through the rising stream of wax particles, and the counterflowing streams are divided into numerous layers of different specific gravities contacting with each other and advancing in intersecting paths as they flow from one baffle to another. These baffles are preferably provided with upwardly inclined top and bottom faces to permit free movement of the rising wax particles. It will be observed that the rising layers of wax particles move upwardly while in contact with the upwardly inclined bottom faces of the baffles, and that said wax particles repeatedly intersect the descending solvent while rising from one upwardly inclined plane to another. The deoiled wax may be discharged through a pipe 27 above the inlet for the deoiling solvent.

The inclined faces of the baffles tend to prevent the wax particles from clinging to said baffles. However, any suitable mechanical means may be employed to prevent or limit the growing of wax crystals which might otherwise extend from the bottom faces of the baffles. For example, the central baffles 26 may be fixed to a slowly rotating shaft 28, so as to rotate with the shaft, and scrapers 29 may extend from the top faces of these rotary baffles to remove waxy material from the bottoms of the stationary baffle rings 25. These stationary baffles may be likewise provided with scrapers 30 extending from their top faces to remove waxy material from the bottom faces of the rotating baffles. In each case, the scrapers extend from the top of one baffle to a point adjacent to the bottom of the next higher baffle. It is not necessary to forcibly scrape the surfaces of the baffles, the object being to limit the thickness of any wax deposit tending to grow on the baffles.

An interesting condition appears in the effective cleansing of the disintegrated wax particles due to the forcible scrubbing and dissolving action of the selective deoiling solvent which repeatedly crosses the path of the wax in the deoiling zone. Attention is also directed to the condition at the lower portion of this deoiling zone where the outgoing solvent stream is diverted from the disintegrating and settling zones. The used deoiling solvent and its dissolved oil solution may descend through a settling zone 31 below the wax inlet pipe 19, and pass out as a separate stream through a discharge pipe 32 at the bottom of said settling zone. Any of the relatively light wax particles swept into the settling zone 31 will eventually rise to the counterflow zone, instead of descending to the discharge pipe 32.

A substantial advantage may be gained by transmitting the used deoiling solvent and its dissolved oil from the counterflow deoiling zone to the incoming stream of wax-containing oil, so as to provide or complete the continuous stream of dewaxing solvent. As a diagrammatical illustration of this condition we have shown a pump 33 arranged to force a continuous stream of the used dewaxing solution from the discharge pipe 32 and through a regulating valve 34 to the pipe 7, thereby transmitting the used deoiling solvent, and the oil recovered therein, to the incoming oil stream. The oil recovered in the deoiling zone is thus returned to the system, while the selective deoiling solvent economically is employed in forming the selective dewaxing solution.

In this process, disintegration of the wax is so important that we have shown details of a suitable disintegrator adapted to very effectively carry out this phase of the invention. The device shown in Fig. 2 and Fig. 3 may be regarded as the disintegrator shown at 11 or 17 in Fig. 1. It comprises a rotary shaft 35 to be driven at a very high speed by means of power transmitted to a driving wheel 36. This rotary shaft 35 is provided with numerous shearing arms 37 which cooperate with numerous stationary arms 38 extending inwardly from a chamber which encloses the breaking or shearing mechanism. As shown in Fig. 2, this chamber may be provided with an inlet A near one end for the admission of coalesced waxy material, and an outlet B near the opposite end for the discharge of a stream of disintegrated wax and liberated oil solution.

The numerous arms 37 and 38 are arranged in an alternating relation, and preferably located so close to each other that a forcible shearing action is produced upon a body of wax between the adjacent arms. The coalesced wax clusters can be thus subjected to a multiplicity of numerous forcible disintegrating operations, which positively liberate all of the trapped oil solution. A high speed device of this kind, adapted to quickly perform a multiplicity of numerous forcible disintegrating operations, is desirable for very efficient commercial practice, as it insures a complete liberation of all of the trapped or occluded oil, which has been an outstanding problem in this old art of separating oil and wax.

However, the present invention is directed to a process which may be carried out with the aid of any suitable apparatus, so it is to be understood that the scope of the claims is not in any way limited to details of the specific apparatus herein described.

We claim:

1. In the art of separating wax and oil, the continuous process of dewaxing the oil and selectively deoiling the wax which comprises precipitating the wax in a liquid solution of the oil and a selective dewaxing solvent in a precipitating zone, thereby forming clusters of coalesced wax crystals with portions of the oil solution trapped in the wax, introducing a continuous stream of the liquid solution and wax into a settling zone, causing the wax to separate from free portions of said liquid oil solution in said settling zone while allowing the wax to coalesce and trap portions of the oil solution in said settling zone, discharging a stream of dewaxed oil solution from said settling zone, transmitting a continuous stream of the wax with portions of said liquid solution from the settling zone to a countercurrent deoiling zone, transmitting a continuous stream of selective deoiling solvent through the wax in said countercurrent deoiling zone, while causing said deoiling solvent and wax to flow in opposite directions in contact with each other, thereby causing the counterflowing deoiling solvent to remove and dissolve portions of the solution carried by the wax, thereafter discharging said wax from said stream of selective deoiling solvent, and subjecting the coalesced wax to successive forcible disintegrating operations while it is in transit from said precipitating zone to said deoiling zone, so as to forcibly liberate trapped oil solution from the disintegrated wax particles.

2. In the art of separating wax and oil, the continuous process of dewaxing the oil and deoiling the wax which comprises precipitating the wax in a liquid solution of the oil and a selective solvent in a precipitating zone, thereby forming clusters of coalesced wax crystals with portions of the oil solution trapped in the wax, introducing a continuous stream of the liquid solution and wax into a settling zone, causing the wax to separate from free portions of said liquid oil solution in said settling zone while allowing the wax to coalesce and trap portions of the oil solution in said settling zone, transmitting a continuous stream of the wax with portions of said liquid solution into a countercurrent deoiling zone, transmitting a continuous stream of selective deoiling solvent through the wax in said countercurrent deoiling zone, while causing said deoiling solvent and wax to flow in opposite directions in contact with each other, thereby causing the counterflowing deoiling solvent to remove and dissolve portions of the solution carried by the wax, thereafter discharging said wax from said stream of deoiling solvent, and subjecting the coalesced wax to a multiplicity of numerous successive forcible disintegrating operations while it is in transit from said precipitating zone to said deoiling zone, so as to forcibly liberate trapped oil solution from the disintegrated wax particles.

3. In the art of separating wax and oil, the continuous process of dewaxing the oil and deoiling the wax which comprises precipitating the wax in a liquid solution of the oil and a selective solvent in a precipitating zone, thereby forming clusters of coalesced wax crystals with portions of the oil solution trapped in the wax, introducing a continuous stream of the liquid solution and wax into a settling zone, causing the wax to separate from free portions of said liquid oil solution in said settling zone while allowing the wax to coalesce and trap portions of the oil solution in said settling zone, discharging a stream of dewaxed solution from said settling zone, transmitting a continuous stream of the wax with portions of said liquid solution from the settling zone to a countercurrent deoiling zone, transmitting a continuous stream of selective deoiling solvent through the wax in said countercurrent deoiling zone, while causing said deoiling solvent and wax to flow in opposite directions in contact with each other, thereby causing the counterflowing deoiling solvent to remove and dissolve portions of the solution carried by the wax, thereafter discharging said wax from said stream of deoiling solvent, subjecting the clusters of coalesced wax to a forcible disintegrating operation while they are in transit from said precipitating zone to said settling zone, so as to forcibly liberate trapped oil solution from the disintegrated wax particles, and forcibly disintegrating the coalesced wax flowing from said settling zone to said countercurrent deoiling zone.

4. In the art of separating wax and oil, the continuous process of dewaxing the oil and deoiling the wax which comprises precipitating the wax in a liquid solution of the oil and a selective solvent in a precipitating zone, thereby forming clusters of coalesced wax crystals with portions of the oil solution trapped in the wax, forcibly disintegrating said wax clusters to positively liberate the trapped oil solution, introducing a continuous stream of the liberated oil solution and disintegrated wax particles into a settling zone, causing the wax to separate from free portions of said liquid oil solution in said settling zone while allowing the disintegrated wax to coalesce and trap portions of the oil solution in the said settling zone, discharging a stream of dewaxed solution from said settling zone, forcibly disintegrating the last mentioned coalesced wax and transmitting a continuous stream of the resultant wax particles and liberated oil solution into a countercurrent deoiling zone, transmitting a continuous stream of selective deoiling solvent through the disintegrated wax in said countercurrent deoiling zone, while causing said deoiling solvent and disintegrated wax particles to flow in opposite directions in contact with each other, thereby causing the counterflowing deoiling solvent to scrub the surfaces of said disintegrated particles and freely dissolve liberated portions of the solution carried by the disintegrated wax, and thereafter discharging said wax from said stream of deoiling solvent.

5. In the art of dewaxing oils and deoiling the wax, the process which comprises maintaining a settling zone in communication with a counterflow deoiling zone, while dewaxing the oil in said settling zone and selectively deoiling the wax in said counterflow deoiling zone, said process including the steps of precipitating wax particles in a relatively heavy dewaxing solution in a precipitating zone, thereby forming clusters of coalesced wax crystals with portions of the oil solution trapped in the wax, transmitting a mixture of the liquid oil solution and wax into said settling zone, causing relatively free portions of the heavy oil solution to drop by gravity from the wax in said settling zone, discharging a stream of dewaxed oil solution from a lower portion of said settling zone, while causing the wax to rise from the dewaxed solution in said settling zone, thereby allowing the rising wax to coalesce and trap portions of the oil solution in said settling zone, transmitting a stream of the wax from said settling zone to said counterflow deoiling zone, causing a stream of the wax to rise in said counterflow deoiling zone, while transmitting a descending stream of relatively heavy deoiling solvent through the mass of rising wax, thereby selectively extracting oily solution from the rising wax in said counterflow zone, separately discharging the streams of wax and used deoiling solvent from said counterflow deoiling zone, and subjecting the coalesced wax to successive forcible disintegrating operations while it is in transit from said precipitating zone to said deoiling zone, so as to forcibly liberate trapped oil solution from the disintegrated wax particles.

6. In the art of dewaxing oils and deoiling the wax, the process which comprises maintaining a settling zone in communication with a counterflow deoiling zone, while dewaxing the oil in said settling zone and selectively deoiling the wax in said counterflow deoiling zone, said process including the steps of precipitating wax particles in a relatively heavy dewaxing solution in a precipitating zone, thereby forming clusters of coalesced wax crystals with portions of the oil solution trapped in the wax, subjecting said wax clusters to a forcible disintegrating operation, so as to forcibly liberate the trapped oil solution, transmitting a mixture of the liberated oil solution and disintegrated wax particles into said settling zone, causing relatively free portions of the heavy oil solution to drop by gravity from the disintegrated wax in said settling zone, discharging a stream of dewaxed oil solution from a lower portion of said settling zone, while causing the disintegrated wax to rise from the dewaxed solution in said settling zone, thereby allowing the rising wax particles to coalesce and trap portions of the oil solution in said settling zone, subjecting the last mentioned coalesced wax to a forcible disintegrating operation, transmitting a stream of the resultant disintegrated wax and liberated oil solution to said counterflow deoiling zone, causing a stream of the disintegrated wax to rise in said counterflow deoiling zone, while transmitting a descending stream of relatively heavy deoiling solvent through the mass of rising wax, thereby selectively extracting liberated oily solution from the rising stream of disintegrated wax in said counterflow zone, at the same time causing said deoiling solvent to scrub the surfaces of said disintegrated wax particles, and separately discharging the streams of wax and used deoiling solvent from said counterflow deoiling zone.

7. In the art of dewaxing oils and deoiling the wax, the process which comprises maintaining a settling zone in communication with a counterflow deoiling zone, while dewaxing the oil in said settling zone and selectively deoiling the wax in said counterflow deoiling zone, said process including the steps of precipitating wax particles in a relatively heavy dewaxing solution, including methylene dichloride, in a precipitating zone, thereby forming clusters of coalesced wax crystals with portions of the oil solution trapped in the wax, subjecting said wax clusters to a multiplicity of numerous forcible disintegrating operations, so as to positively release the trapped oil solution, transmitting a mixture of the liquid oil solution and disintegrated wax into said settling zone, causing relatively free portions of the heavy oil solution to drop by gravity from the disintegrated wax in said settling zone, discharging a continuous stream of dewaxed oil solution from a lower portion of said settling zone, while causing the previously disintegrated wax to rise from the dewaxed solution in said settling zone, thereby allowing the rising wax particles to coalesce and trap portions of the oil solution in said settling zone, subjecting the last mentioned coalesced wax to numerous forcible disintegration operations, transmitting a stream of the resultant disintegrated wax and liberated oil solution to said counterflow deoiling zone, causing a stream of the disintegrated wax to rise in said counterflow deoiling zone, while forcibly transmitting a descending stream of relatively heavy deoiling solvent through the disintegrated mass of rising wax, thereby selectively extracting liberated oily solution from the rising stream of disintegrated wax in said counterflow zone, at the same time causing said deoiling solvent to forcibly scrub the surfaces of said disintegrated wax particles, and separately discharging the streams of wax and used deoiling solvent from said counterflow deoiling zone.

EDDIE M. DONS.
OSWALD G. MAURO.